(12) United States Patent  (10) Patent No.: US 8,851,455 B2
Rossi et al.  (45) Date of Patent: Oct. 7, 2014

(54) REEL ASSEMBLY FOR CHAIN HOIST

(75) Inventors: Tim G. Rossi, Bolton (CA); Terry C. Hu, Markham (CA)

(73) Assignee: Ventra Group, Inc., Bradford (CA)

( * ) Notice: Subject to any disclaimer, the term of this patent is extended or adjusted under 35 U.S.C. 154(b) by 215 days.

(21) Appl. No.: 13/614,958

(22) Filed: Sep. 13, 2012

(65) Prior Publication Data

US 2014/0072394 A1 Mar. 13, 2014

(51) Int. Cl.
*B66D 1/20* (2006.01)

(52) U.S. Cl.
USPC ........ 254/358; 254/372; 224/42.23; 474/155; 474/186

(58) Field of Classification Search
USPC .................. 254/358, 372; 474/155, 174–176; 224/42.23
See application file for complete search history.

(56) References Cited

U.S. PATENT DOCUMENTS

| | | |
|---|---|---|
| 839,325 A | 12/1906 | Scott |
| 2,321,702 A | 6/1943 | Renkin |
| 2,477,783 A | 8/1949 | Britt |
| 2,656,150 A | 10/1953 | Lock |
| 3,266,331 A | 8/1966 | Burrows |
| 3,582,125 A | 6/1971 | Collins |
| 3,766,791 A | 10/1973 | Huttinger |
| 3,856,167 A | 12/1974 | Yasue et al. |
| 4,059,197 A | 11/1977 | Iida |
| 4,095,478 A | 6/1978 | Rynik |
| 4,108,014 A | 8/1978 | Schreyer et al. |
| 4,240,668 A | 12/1980 | Sedlaczek et al. |
| 4,343,614 A | 8/1982 | Schulte |
| 4,473,364 A * | 9/1984 | Roling .......................... 474/164 |
| 4,501,577 A * | 2/1985 | Roling et al. ................. 474/155 |
| 4,804,353 A | 2/1989 | Wenman |
| 4,850,942 A | 7/1989 | Dalferth |
| 5,533,938 A | 7/1996 | Dalferth |
| 5,803,851 A | 9/1998 | Walenta et al. |
| 6,030,307 A * | 2/2000 | Oka .............................. 474/175 |
| 6,199,830 B1 | 3/2001 | Kiiski |
| 6,905,432 B2 | 6/2005 | Oser |
| 6,925,794 B2 | 8/2005 | Dalferth et al. |
| 8,038,558 B2 * | 10/2011 | Klabisch et al. ............. 474/155 |
| 8,157,246 B2 * | 4/2012 | Weingartner ................. 254/372 |
| 2005/0170924 A1 * | 8/2005 | Meya et al. ................... 474/155 |
| 2006/0013679 A1 | 1/2006 | Posani |
| 2007/0042850 A1 | 2/2007 | Klabisch et al. |
| 2008/0153645 A1 | 6/2008 | Chiu |
| 2010/0016107 A1 | 1/2010 | Klabisch et al. |

OTHER PUBLICATIONS

Case Hardened Chains, http://www/pewagtireprotectionchains.com/Files/d6/d6b18356-6981-46d1-a556-d98b4bd6c332.pdf, pp. 33-35 (Jan. 17, 2012).

* cited by examiner

*Primary Examiner* — Emmanuel M Marcelo
(74) *Attorney, Agent, or Firm* — Pillsbury Winthrop Shaw Pittman LLP

(57) ABSTRACT

A reel assembly for a chain hoist having a sprocket mounted to a drive portion of a reel. The sprocket is configured to distribute rotational force to links of a drive chain, such as for moving a spare tire in and out of an access position. The sprocket has a first axial half and a second axial half that are formed via a stamped materials and fixedly secured together centrally and mounted on the drive portion. The sprocket includes protrusions and pairs of fingers arranged around and extending radially from a perimeter thereof in an alternating configuration in a circumferential direction. Each protrusion is constructed and arranged to at least partially extend through and engage at least insides of alternate horizontal links of the chain. The pairs of fingers are configured to be circumferentially aligned and receive radially oriented links of the chain therebetween and contact the outsides thereof.

18 Claims, 9 Drawing Sheets

REEL ASSEMBLY FOR CHAIN HOIST

BACKGROUND

1. Field

The present disclosure is generally related to a stamped reel assembly for use with a chain hoist. The hoist can be used in a spare tire carrier.

2. Description of Related Art

Prior methods for forming reels typically include a process for casting material(s) (e.g., cast iron) to form a single reel part. Such methods result in forming a reel which is heavy and more costly in both material and a method of manufacturing. Cast reels are also limited with regards to placement and design of its parts. U.S. Pat. Nos. 5,803,851, 6,925,794, and 8,038,558 describe some examples of chain drives with reels or wheels that are typically used with chains. Such known systems have pockets in their wheels that receive horizontal links of the chain therein.

SUMMARY

One aspect of this disclosure provides a reel assembly including a drive portion configured for rotation about an axis and a sprocket mounted to the drive portion and configured to be driven rotationally about the axis by the drive portion to drive a drive chain. The sprocket has a first axial half and a second axial half fixedly secured and a central mounting portion for mounting with the drive portion. The sprocket further has protrusions and pairs of fingers arranged around and extending in a radial direction from a perimeter thereof, the protrusions and the pairs of fingers being in an alternating configuration in a circumferential direction of the sprocket. Each protrusion extends in the radial direction relative to the axis of the sprocket and is constructed and arranged to at least partially extend through and engage at least insides of alternate circumferentially oriented links of the drive chain. Each protrusion has a first protrusion portion integrally formed as one-piece with the first axial half and a second protrusion portion integrally formed as one-piece with the second axial half with the first and second protrusion portions circumferentially aligned to define the protrusion. The pairs of fingers each have a first finger and a second finger spaced apart from one another in an axial direction and each extending in the radial direction. The first finger of each pair is integrally formed as one-piece with the first axial half of each pair and the second finger of each pair is integrally formed as one-piece with the second axial half, and the first finger and second finger of each pair are circumferentially aligned with one another. The pairs of fingers adjacent to each protrusion are each configured to receive alternate radially oriented links of the drive chain therebetween and contact outsides thereof.

Another aspect of this disclosure provides a chain hoist system for a spare tire carrier in a vehicle including: an attachment device for holding a spare tire; an elastic member adjacent to the attachment device and configured for movement between a storage position and an extended position, and a housing containing a reel assembly for a chain hoist configured to move the elastic member between its storage position and extended position. The reel assembly includes: a drive portion configured for rotation about an axis and a sprocket mounted to the drive portion and configured to be driven rotationally about the axis by the drive portion to drive a drive chain. The sprocket has a first axial half and a second axial half fixedly secured together and a central mounting portion for mounting with the drive portion. The sprocket further has protrusions and pairs of fingers arranged around and extending in a radial direction from a perimeter thereof. The protrusions and the pairs of fingers are in an alternating configuration in a circumferential direction of the sprocket. Each protrusion extends in the radial direction relative to the axis of the sprocket and is constructed and arranged to at least partially extend through and engage at least insides of alternate circumferentially oriented links of the drive chain. Each protrusion has a first protrusion portion integrally formed as one-piece with the first axial half and a second protrusion portion integrally formed as one-piece with the second axial half with the first and second protrusion portions circumferentially aligned to define the protrusion. The pairs of fingers each have a first finger and a second finger spaced apart from one another in an axial direction and each extending in the radial direction. The first finger of each pair is integrally formed as one-piece with the first axial half of each pair and the second finger is integrally formed as one-piece with the second axial half, and the first finger and second finger of each pair are circumferentially aligned with one another. The pairs of fingers adjacent to each protrusion are each configured to receive alternate radially oriented links of the drive chain therebetween and contact the outsides thereof.

Yet another aspect of this disclosure provides a method for forming a reel assembly. The method includes: stamping from sheet metal a first axial half of a sprocket, the first axial half having first protrusion portions and first fingers extending from a perimeter thereof in an alternating configuration in a circumferential direction; stamping from sheet metal a second axial half of the sprocket, the second axial half having second protrusion portions and second fingers extending from a perimeter thereof in an alternating configuration in a circumferential direction; and fixedly securing the first axial half and the second axial half together to form the sprocket. After the securing, the sprocket has a central mounting portion for mounting with a drive portion of a reel and further has protrusions and pairs of fingers arranged around and extending in a radial direction from a perimeter thereof. The protrusions and the pairs of fingers are in an alternating configuration in a circumferential direction of the sprocket. Each protrusion extends in the radial direction relative to the axis of the sprocket and is constructed and arranged to at least partially extend through and engage at least insides of alternate circumferentially oriented links of a drive chain of the reel. Each protrusion of the sprocket has first protrusion portions of the first axial half and second protrusion portions of the second axial half that are circumferentially aligned to define the protrusion. The pairs of fingers each have first fingers and second fingers spaced apart from one another in an axial direction and each extend in the radial direction, the first fingers of each pair from the first axial half and the second fingers of each pair from the second axial half, and the first finger and second finger of each pair being circumferentially aligned with one another. The pairs of fingers of the sprocket adjacent to each protrusion are each configured to receive alternate radially oriented links of the drive chain therebetween and contact outsides thereof.

Other objects, features, and advantages of the present disclosure will become apparent from the following detailed description, the accompanying drawings, and the appended claims.

DETAILED DESCRIPTION

This disclosure proposes a multi-piece reel assembly with a sprocket that is formed using parts that are stamped. The stamped sprocket is constructed and arranged such that each chain link that goes around the reel contacts an extended support portion (e.g., protrusion or finger). For example, as noted in the background, typical known systems have pockets in their wheels or reels that receive horizontal links of the chain therein. Throughout this disclosure, horizontal refers to the link being parallel to the reel axis, whereas vertical refers to the link being perpendicular thereto; the terms circumferential and radial, respectfully, can be used also, and are also used throughout. In contrast, this disclosed assembly has, for example, protrusions that are inserted through horizontal links of the chain and pairs of fingers that receive the vertical links therebetween. The protrusions links (which are inside the horizontal links) may also contact the ends of the vertical links, and the pairs of fingers (which have the vertical links in a space therebetween) may also contact the ends of the horizontal links. Accordingly, the herein described sprocket of the reel assembly is configured to contact both insides and outside surfaces of the consecutive links of a chain in order to provide a better force distribution and chain retention.

Figure 1:
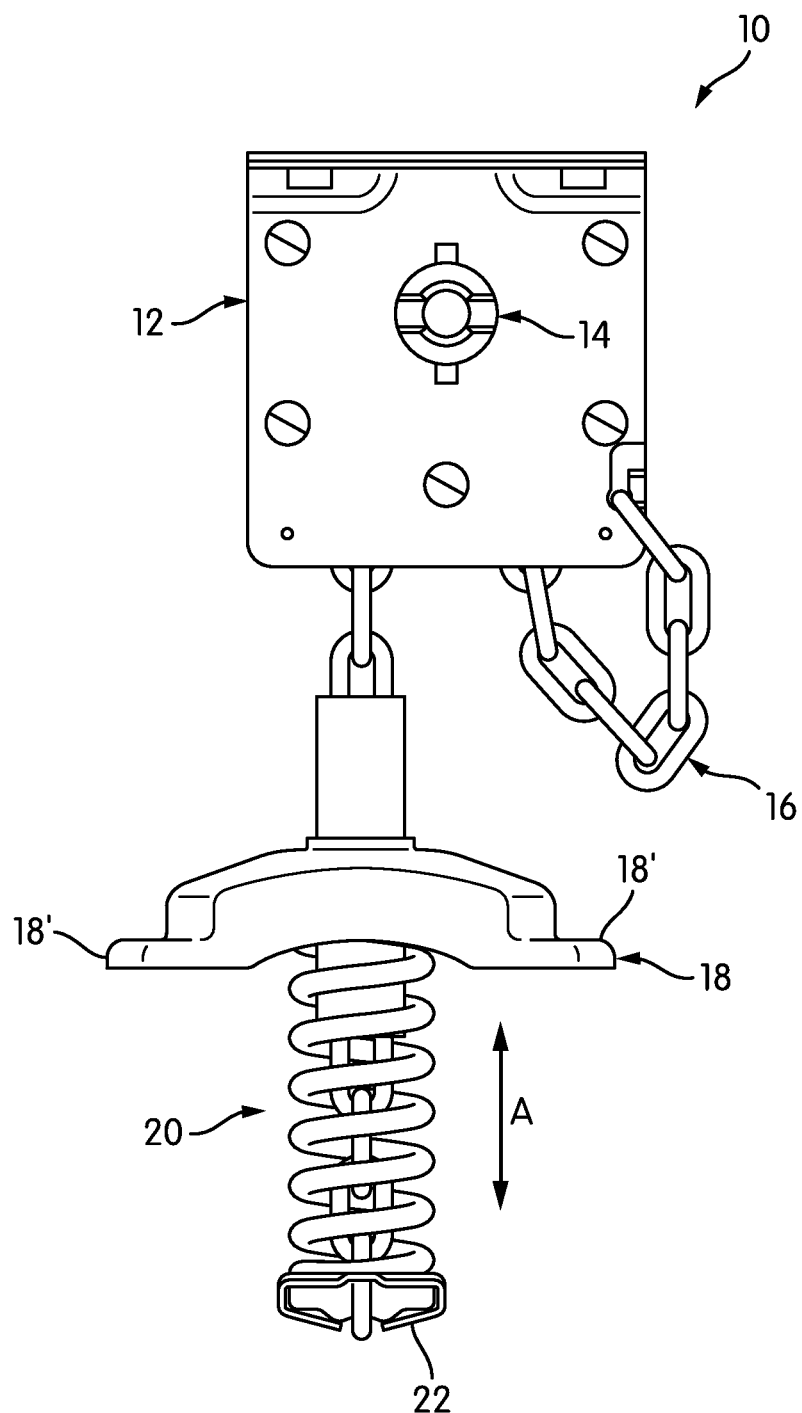
FIGS. 1 and 2 illustrate a side and perspective view of a chain hoist assembly for use as a spare tire carrier in a vehicle.
Figure 2:
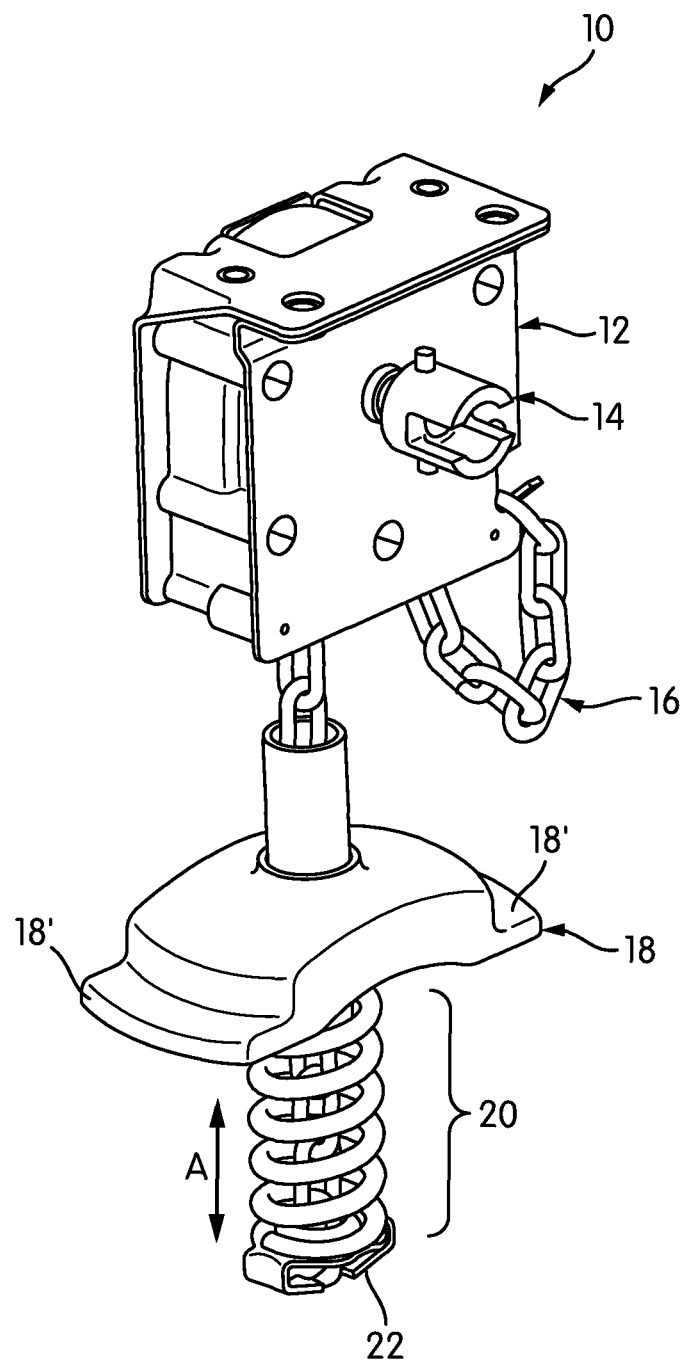

FIGS. 1 and 2 illustrate a side and perspective view of a chain hoist assembly 10. Chain hoist assembly 10 and its illustrated external parts shown in FIGS. 1 and 2 are exemplary and for reference only. Such illustrations are not intended to be limiting. A hoist, like chain hoist assembly 10, is a device used for lifting or lowering a load by means of a drum or lift-wheel—in this disclosure, called a reel—around which a lifting device wraps and is configured to move therealong. It may be manually operated (e.g., by a set of tools used with a vehicle jack), electrically driven, or fluidly driven (i.e., pneumatically or hydraulically), and thus any type of drive input may be used.

In accordance with an embodiment of this disclosure, chain hoist assembly 10 is used as a tire hoist or winch on a vehicle to secure a spare tire to the vehicle. In accordance with an embodiment, the disclosed stamped reel assembly is set in and used in a hoist assembly provided at an underside of a transportation vehicle (e.g., car, truck, van, SUV, etc.), such as the undercarriage.

Chain hoist assembly 10 houses a chain reel assembly 30 within its housing or shroud 12. Shroud 12 is mounted within the vehicle, such as in an undercarriage. A drive chain 16 is used as the lifting device and to support the weight of the load (e.g., tire). As a general example, an end of the drive chain extends downwardly from the shroud 12 and is connected to an end piece 22. The load (e.g., tire) is attached to the chain hoist assembly by a hook, bracket, or other type of attachment device 18. Attachment device 18 is provided adjacent to the same end of the chain of the end piece 22. For example, tire can be attached via the middle opening of its rim to attachment device 18. For example, the attachment device 18 is an oblong bracket that the user can fit through the opening in the tire rim by tilting it as the end piece 22 is fed through the opening. Because the oblong slope is longer than the rim opening's diameter, the tire rim will sit on flanges 18'.

Between attachment device 18 and end piece 22 is an elastic member 20. Elastic member 20 is mounted between and adjacent to attachment device 18 and is configured for movement between a storage position and an extended position to absorb movement of the tire, e.g., during driving of the vehicle.

More specifically, reel assembly 30 is configured to move the tire between its storage position and extended position through rotation of a drive input 14 about an axis B-B (shown in FIG. 5) that is connected to a reel inside shroud 12. Once rotation is provided to the chain reel assembly 30, the rotational motion can be transferred to the chain 16. The chain 16 can be moved in a clockwise or counterclockwise direction. As drive chain 16 moves about a reel with shroud 12, the chain will move substantially vertically (up and/or down, as indicated by arrow A), which in turn moves end member 22 in a vertical direction to tighten and/or collapse elastic member 20. This allows a user to either store or access the spare tire, when needed. For example, when the chain is moved in a clockwise direction (in FIGS. 1 and 2), its end is retracted towards the shroud 12. As the chain end retracts, the attachment device 18 and end piece 22 move relative to and towards shroud 12 until end piece is adjacent to attachment device 18 and the tire is lifted to its storage position adjacent to the undercarriage of the vehicle. Part of the chain (i.e., near or at an end opposite the attachment device) can optionally extend from the shroud, such as generally shown in FIGS. 1 and 2. To access the spare tire, the chain is rotated in an opposite, i.e., counterclockwise, direction via rotation of the chain reel assembly, which advances the outer end of the chain. When the chain is advanced, the end piece 22 moves relative to and away from shroud 12, thereby allowing movement of the tire via the attachment device 18 downwardly and away from the undercarriage, to an extended position, so that it may be accessed and removed therefrom.

Figure 3:
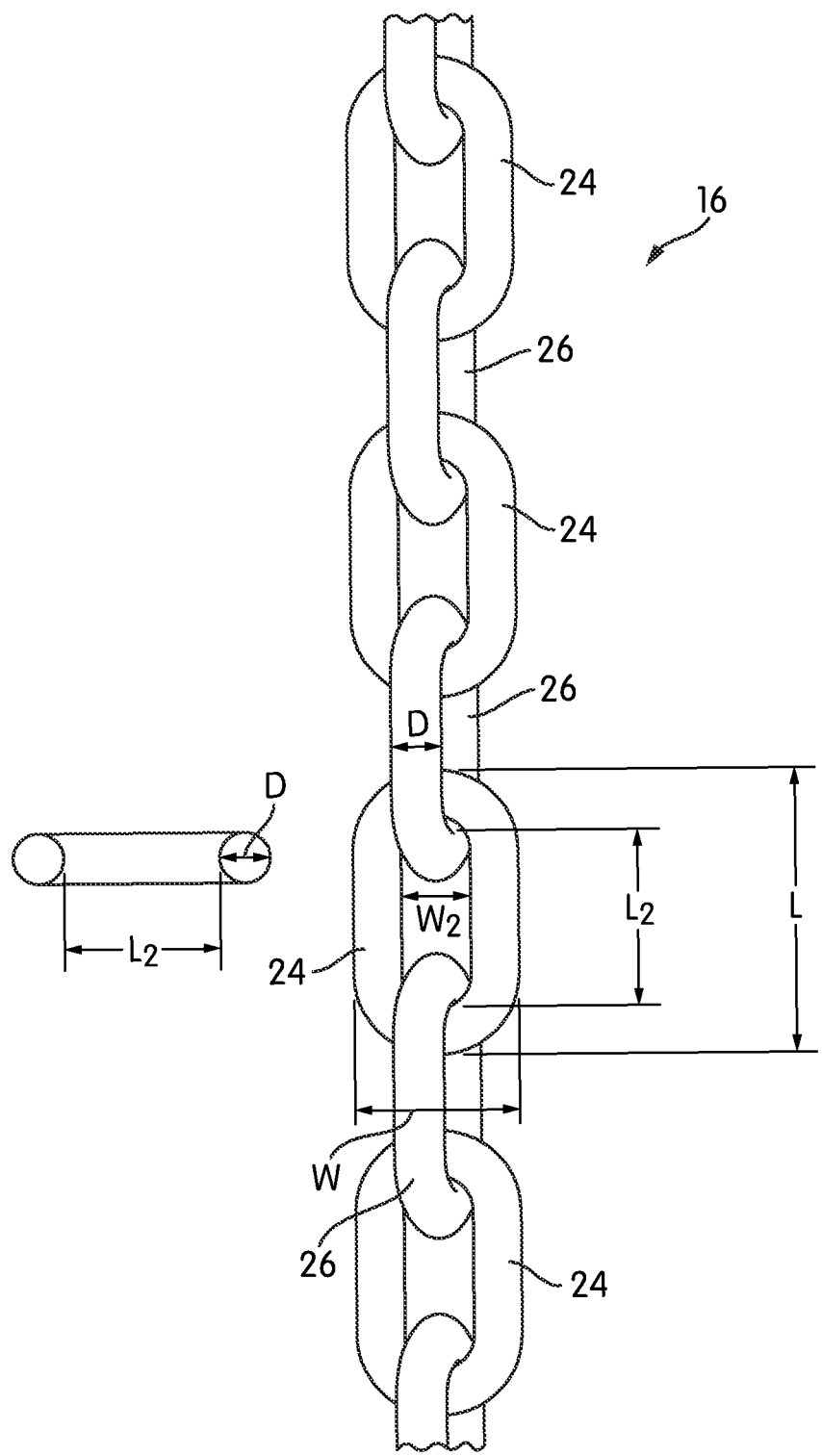
FIG. 3 shows a detailed view of links of a traditional chain for use with a chain reel assembly as disclosed herein.

The drive chain 16 used with the disclosed reel assembly 30 does not require any particular design or configuration of its links (such as flattened zones on its ends or body). Traditional chain links may be used. FIG. 3 shows a detailed view of links of a traditional chain for use as a drive chain 16 with chain reel assembly 30 as disclosed herein. Drive chain 16 has alternating horizontal links 24 and vertical links 26, as is generally known in the art. For example, each horizontal link 24 is connected to an adjacent vertical link 26 on each side. Each of the links of drive chain 16 comprises a generally oval shape with an opening therein, but it is also envisioned that the drive chain 16 may also be a profile chain or have links that are circular in shape. Each link 24 and 26 has an overall length L, an internal length L2, an overall width W, and an internal width W2 (of the link opening). The link body has a diameter, D, which also corresponds to a chain size. The size of drive chain 16 used with a spare tire carrier is selected from loading criteria from the car manufacturer (customer). The tire mass and vehicle g forces can be considered is determined the chain size. Some examples that can be used are chains with 4.0 mm or 5.0 mm wire diameter.

Figure 4:
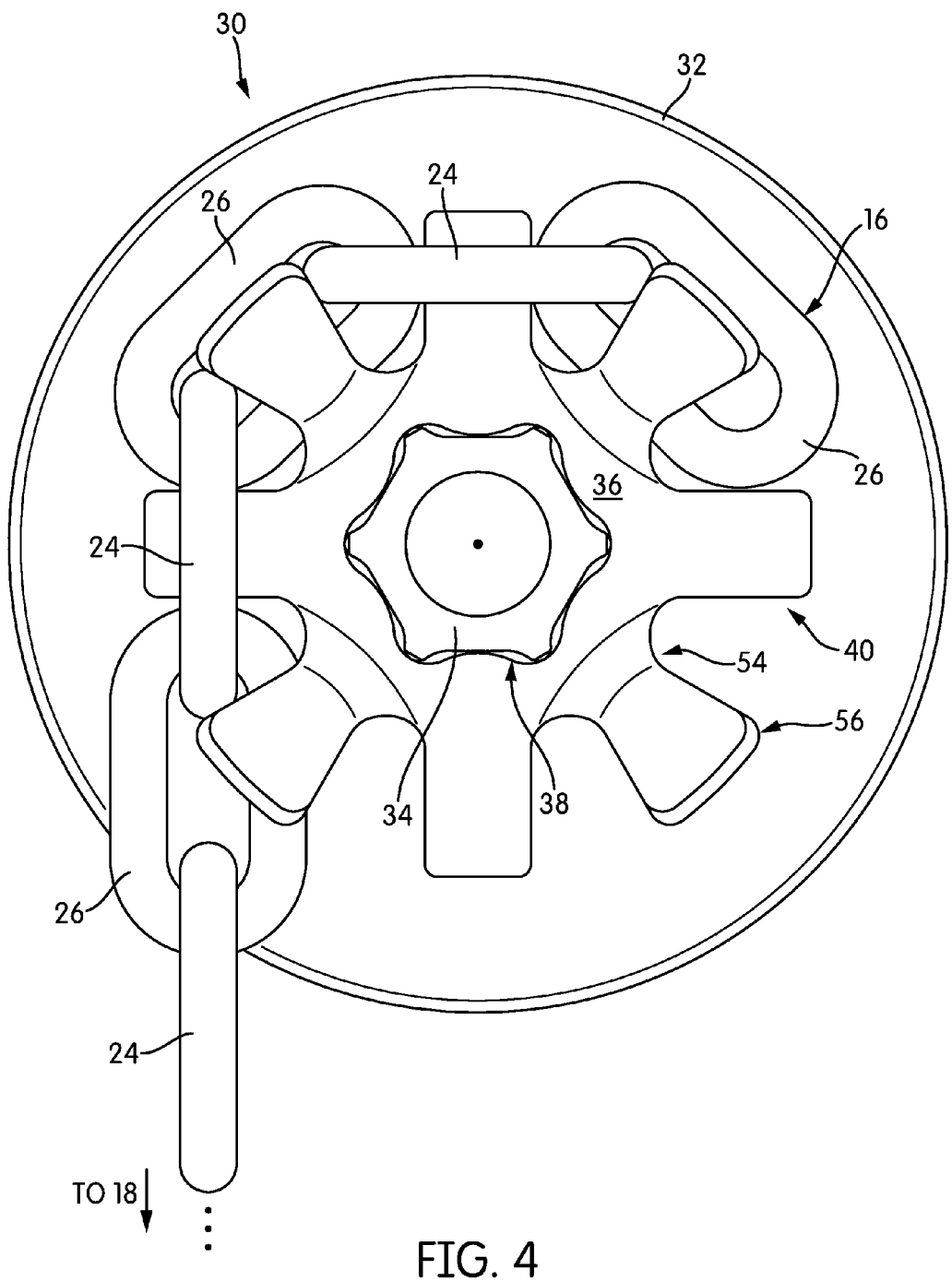
FIG. 4 shows a side view of a chain reel assembly used in the chain hoist assembly of FIGS. 1 and 2, in accordance with an embodiment.
Figure 5:
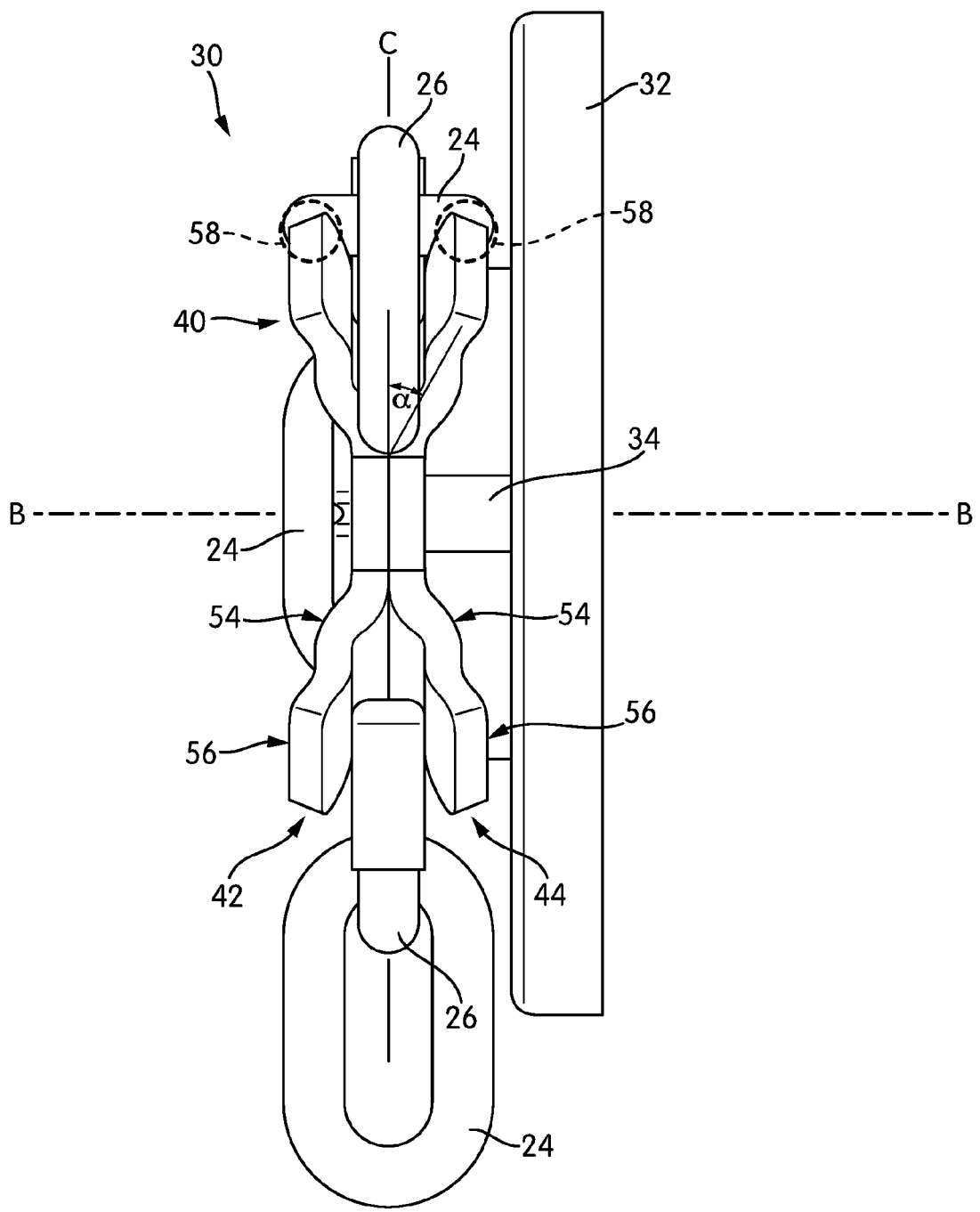
FIG. 5 shows a side view of the chain reel assembly of FIG. 3.
Figure 6:
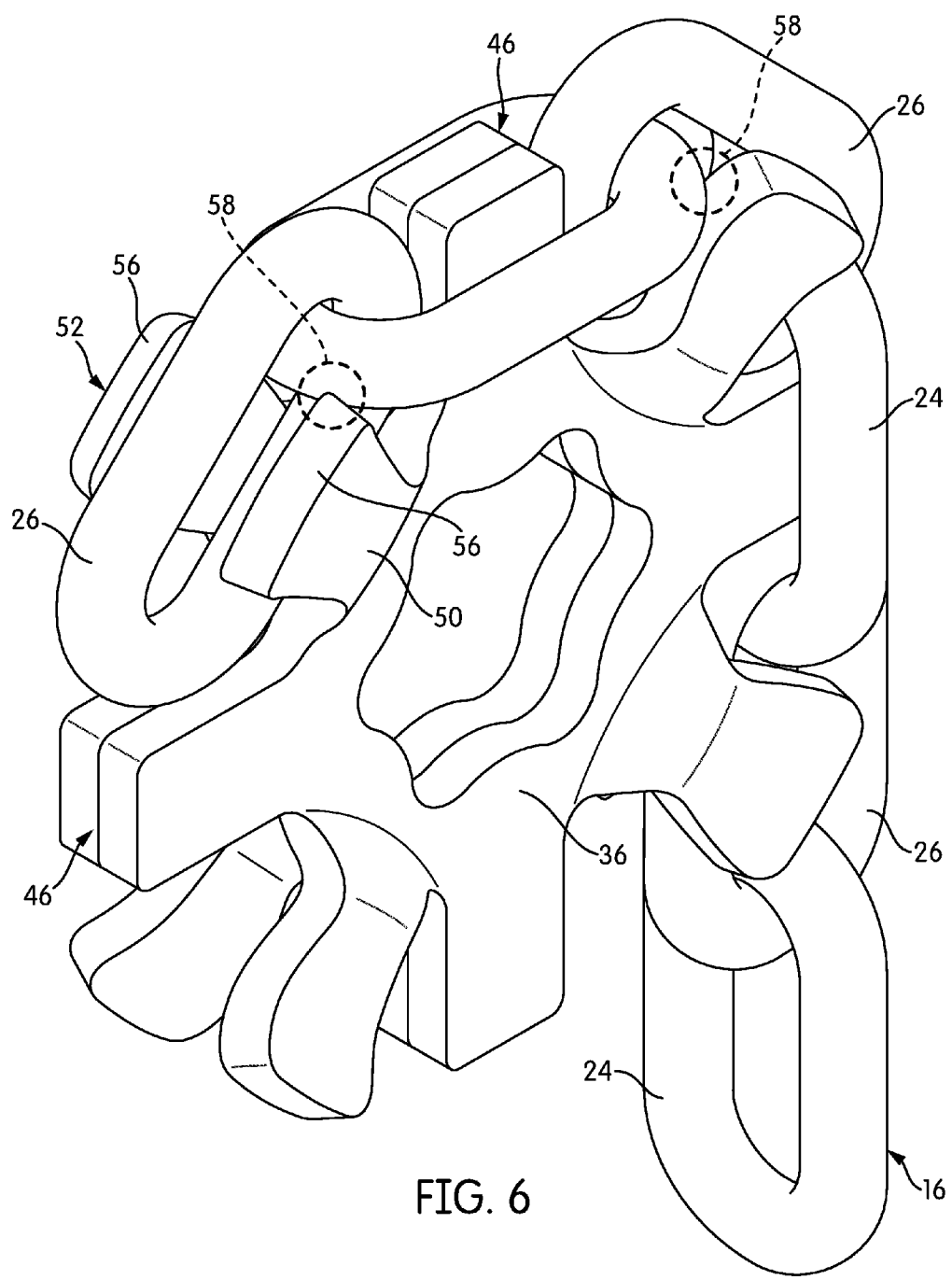
FIG. 6 shows a perspective view of a sprocket of the chain reel assembly of FIG. 3 with links of the chain thereon and in contact with protrusions and fingers of the sprocket.

As shown by the views in FIGS. 4-6, the horizontal and vertical links 24 and 26 of drive chain 16 are guided along and by the reel assembly 30. As will become further understood by the description and Figures provided through, chain reel assembly 30 is a multi-piece assembly rather than a one-piece cast part. Reel assembly 30 comprises a reel 32 including a drive portion 34 configured for rotation about an axis B-B (see FIG. 5). Drive portion 34 is driven via drive input 14, shown in FIG. 2, for example. Drive portion 34 can be directly connected to drive input 14 through a slot or opening in the shroud 12, for example. In other embodiments, drive portion 34 itself may be the drive input.

A sprocket 40 is mounted to the drive portion 34 of reel 32 and configured to be driven rotationally about the axis B-B by the drive portion 34. Sprocket 40 is configured to distribute rotational force to links 24 and 26 of drive chain 16 as the connected links 24 and 26 are moved about the sprocket. Sprocket 40 comprises a base 36 with a central mounting portion 38 for mounting with the drive portion 34 of the reel 32. Drive portion 34 and central mounting portion 38 of sprocket 40 are formed of complimentary shapes such that they can be attached and/or mounted together for cooperative rotational movement. In accordance with one embodiment, such as shown in FIG. 4, central mounting portion 38 of sprocket 40 is an opening. The opening may be non-circular in shape, polygonal in shape, or any other number of shapes.

Figure 8:
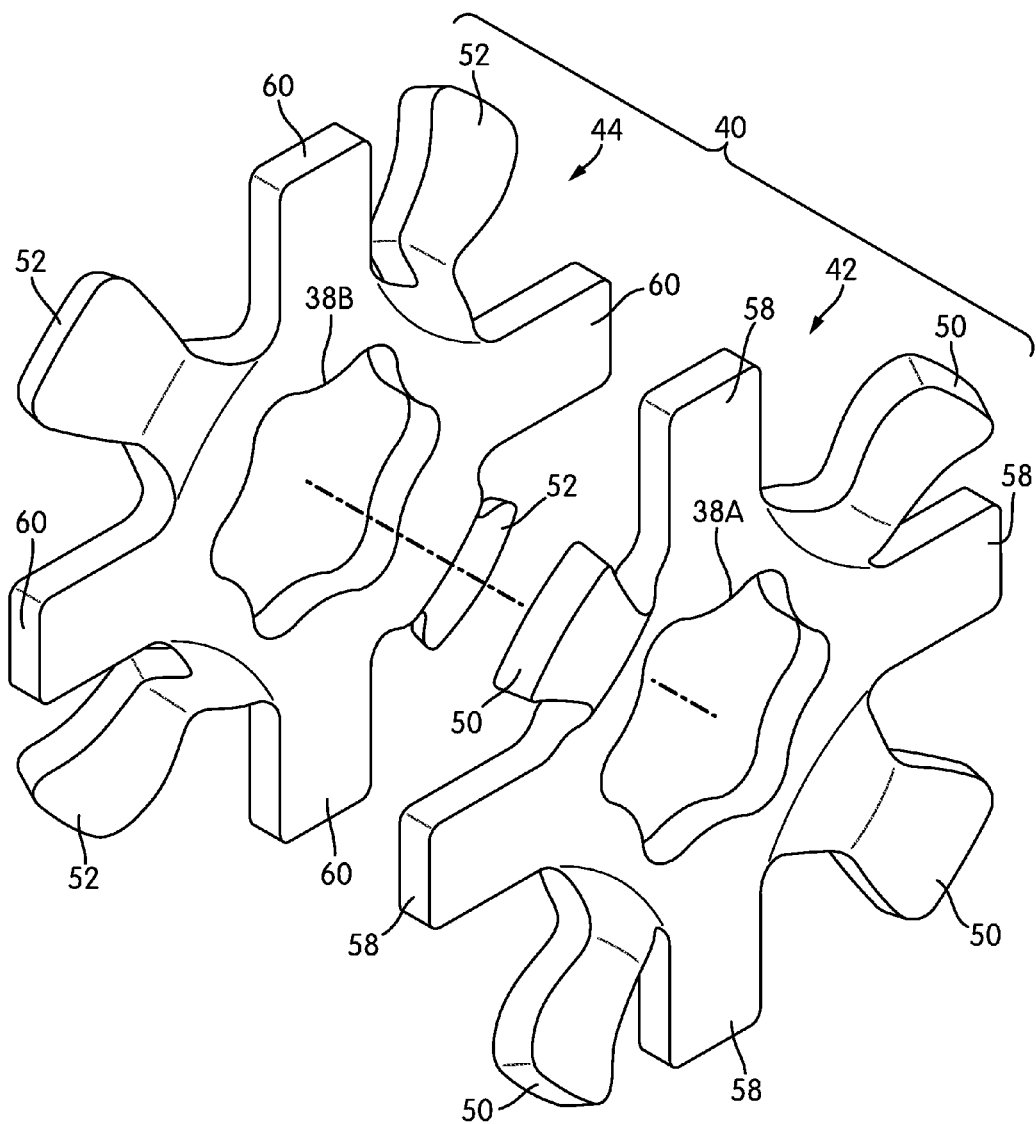
FIG. 8 shows an exploded perspective view of the parts that form the sprocket of FIG. 7.

Specifically, sprocket 40 is formed from a first axial half 41 and a second axial half 43 that are fixedly secured together, as shown in greater detail in FIG. 8. Each half 41 and 43 comprises parts that used to form the protrusions 46 and pairs 48 placed around the sprocket 40 perimeter. For example, the first axial half 41 comprises alternating first protrusion portions and first fingers. The second half 43 comprises alternating second protrusion portions and second fingers.

As assembled, sprocket 40 of reel assembly 30 has protrusions 46 that extend from base 36 and are configured for insertion through openings of horizontal links 24 as drive chain 16 is rotationally guided around by reel 32. FIG. 6 illustrates an example of sprocket 40 with drive chain 16 therearound. Additionally, it is also shown that sprocket 40 has pairs 48 of fingers and that are configured to rotationally guide vertical links therebetween. More specifically, protrusions 46 and pairs 48 of fingers and are arranged around and extend in a radial direction from a perimeter of sprocket 40 in an alternating configuration in circumferential direction of the sprocket 40. The fingers 48 of each pair are axially spaced apart from one another and axially offset from opposing sides of the protrusions 46, preferably equidistantly. This accommodates the alternating horizontal and vertical links 24 and 26 of drive chain 16. In an embodiment, each protrusion 46 and each pair 48 of fingers is spaced substantially equidistant from each other in the circumferential direction of the sprocket 40.

Each protrusion 46 extends in a radial direction (also referred to as vertical or perpendicular direction) from base 36, relative to axis B-B of drive portion 34 when sprocket 40 is mounted thereon. Each protrusion 46 is constructed and arranged to at least partially extend through and engage at least insides of alternate circumferentially oriented links of drive chain 16; i.e., to extend through link openings of and engage at least insides of horizontal links 24 of drive chain 16. Each protrusion 46 can also be constructed and arranged to engage outsides of adjacent links of drive chain 16 (i.e., vertical links 26) that are connected to the alternate circumferentially oriented links (i.e., horizontal links 24) that each protrusion 46 extends at least partially through. For example, as shown in FIG. 6, an outside (vertical) surface of protrusion 46 can engage an outside surface of a curved portion of either or both vertical links 26 connected on either or both sides of the horizontal links 24 of drive chain 16. Preferably, the protrusions 46 may be along the circumferential centerline (i.e., like the equator) of the sprocket 40.

Each protrusion 46 is formed from a first protrusion portion integrally formed as one-piece with the first axial half 41 and a second protrusion portion integrally formed as one-piece with the second axial half 43, with the first and second protrusion portions being circumferentially aligned to define the protrusion (e.g., see FIG. 8).

Each of the pairs 48 of fingers include a first finger 50 and a second finger 52 spaced apart from one another in an axial direction and each extending in the radial direction. The first finger 50 is integrally formed as one-piece with the first axial half 41 and the second finger 52 is integrally formed as one-piece with the second axial half 43. The first finger 50 and second finger 52 of each pair 48 are configured to be axially offset yet circumferentially aligned with one another to form a respective pair. Each finger extends from base 36 and includes a proximal portion 54 and a distal end portion 56. For purposes of simplicity only, the proximal portions 54 and distal end portions 56 of first fingers 50 and second fingers 52 are similarly labeled throughout the Figures. The pairs 48 of fingers adjacent to each protrusion 46 are each configured to receive the alternate radially oriented links of the drive chain 16 therebetween and contact the outsides thereof. That is, first finger 50 and second finger 52 of each of the pairs 48 of fingers are configured to receive therebetween adjacent links (i.e., vertical links 26) of drive chain 16 that are connected to the alternate circumferentially oriented links (i.e., horizontal links 24) that each protrusion 46 extends at least partially through.

Additionally, each protrusion 46 can be further constructed and arranged to engage outside ends of adjacent radially oriented links (i.e., vertical links 26) of the drive chain 16 that are received between the adjacent pairs of fingers and connected to the horizontal links 24 that each protrusion extends at least partially through. Moreover, at least ends 56 of the first finger 50 and second finger 52 of each of the pairs 48 may be configured to engage an outside surface of a curved portion of horizontal links 24 connected on either or both sides of the vertical links 26 of drive chain 16. This assists in greater distribution of rotational force to each of the links 24 and 26 that are guided around the reel 32. FIGS. 5 and 6 show generally at 58 locations where the fingers can contact the horizontal links 24. It should be understood, however, that although only first fingers 50 of each pair 48 are indicated at 58 in FIG. 6 as being in contact, second fingers 52 are also in contact with horizontal links 24 on an opposite side thereof in a substantially similar manner as they are moved rotationally around.

In one embodiment, first finger 50 and second finger 52 of each of the pairs 48 of fingers extend at an acute angle α relative to a plane C that is perpendicular to axis B-B for rotation (see FIG. 5). That is, when paired, the fingers flare out away from each other to form a space between to help guide links therebetween. In an embodiment, the angle α is equal to and/or between approximately 20 degrees to approximately 30 degrees. In another embodiment, the angle α is approximately 25 degrees to approximately 26 degrees. In yet another embodiment, each finger 50 and 52 is formed such that an inner surface of the tops (distal ends) of each finger 50 and 52 flares at an angle of approximately 25 degrees to approximately 26 degrees relative to plane C.

In accordance with an embodiment, the shape, positioning, and dimensions of the fingers and/or protrusions is designed to accommodate the size of the chain link used with the assembly. Different sized links require adjustments to the size/shape of the fingers and/or the protrusions. For example, since the pairs of fingers are configured to interface with the vertical links of the chain, each of the fingers are provided configured to extend at an angle α such that a space is formed between the flared, distal ends (at their tops), when paired. This space between the fingers distal ends is sized to allow free receipt and movement of vertical links (engagement and disengagement of the links) between the pairs of fingers of the reel without jamming. Yet the dimensions of the space between the distal ends of the paired fingers is also sized such that it is not wider than horizontal links of the chain (and can thus provide contact and support at 58). Accordingly, the angle α of each finger, as stamped, can be affected based on the dimension of the space between the fingers at their distal ends, when paired. Further, as observed in FIGS. 5 and 6, as each finger transitions towards its bottom (i.e., towards its proximal end, nearest base 36 and central mounting portion 38), it has a bend therein. The bend(s) of the fingers result in a narrowing of the size of the space between the pair of fingers towards their proximal ends, while still allowing for receipt therebetween. This space (which appears as a non-limiting substantial "V"-shape in FIG. 5) as designed is configured to maximize the cross section for strength during load application from the chain. Additionally, the narrowing of the space results in a vertical link received therebetween being centrally located and substantially in-line with the adjacent protrusions of the reel.

Moreover, the reel design and dimensions allow for adequate size of tooling to make the part (e.g., the spacing and dimensions of and between the fingers and protrusions is designed such that the stamping tools avoid being broken). In an embodiment, the thickness of the material used does not change after stamping at least along the formed shape of the fingers and remains substantially constant throughout (e.g., from its bend to its flared end). In an embodiment, the thickness of each side remains substantially the same after stamping. Both halves of the reel are essentially similar.

Figure 9:
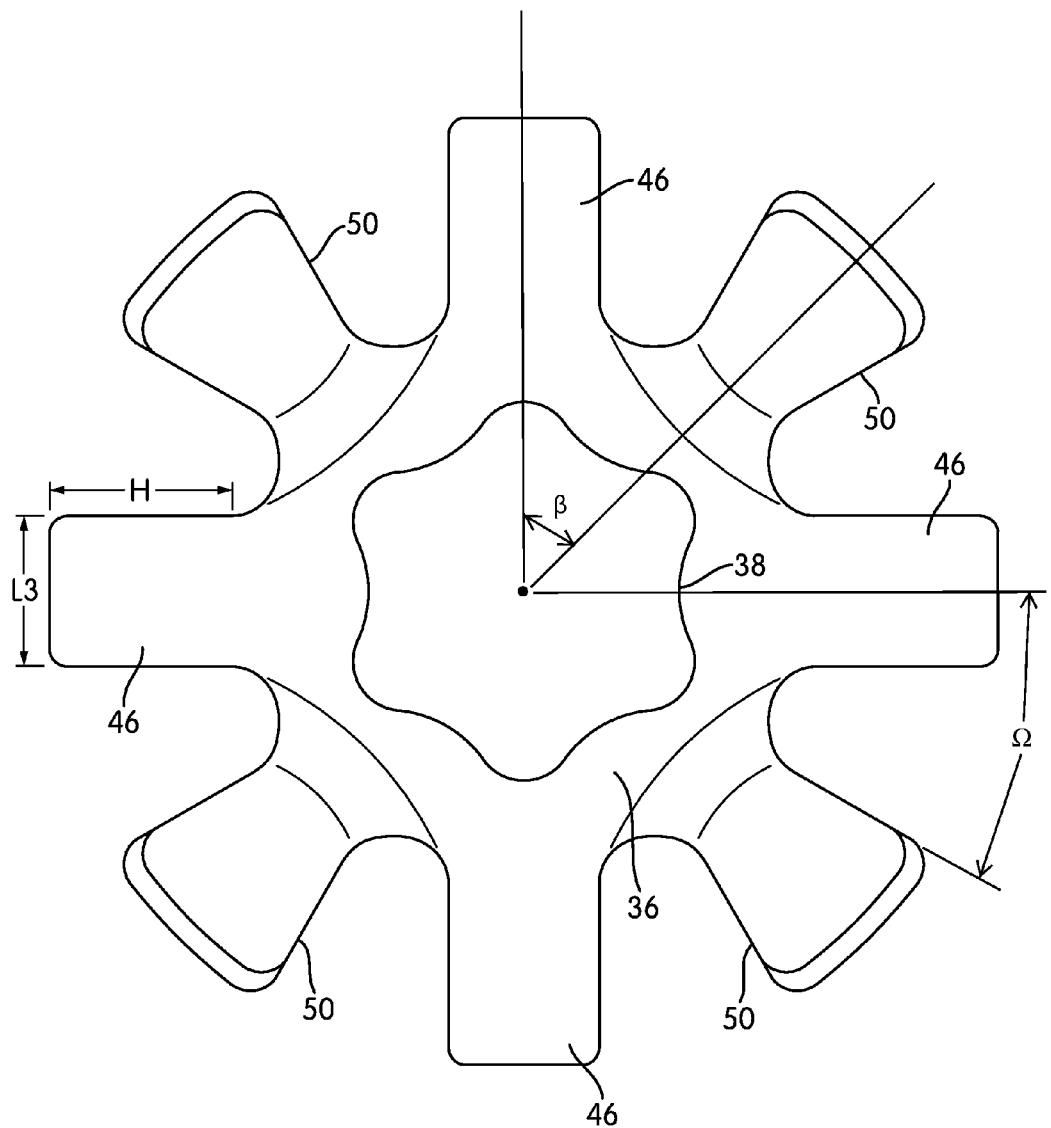
FIG. 9 shows a side view of the sprocket of FIG. 7.

The dimensions of and between the protrusions and fingers of each half are not meant to be limiting. In an embodiment, such as can be observed in FIG. 9, for example, each finger is positioned at approximately 90 degrees from another finger around a half of the reel. Similarly, each protrusion (or the part used to form the protrusion) is positioned approximately 90 degrees from another protrusion around the half of the reel. Each protrusion and finger can be positioned around a half of the reel an angle β relative to another adjacent part. Accordingly, in one embodiment, each adjacent protrusion and finger extends from a center of the reel at an angle β of approximately 45 degrees (e.g., relative to axis B-B). FIG. 9 also shows an angle Ω that may be formed between an edge of a finger and a center of a protrusion. In an embodiment, angle Ω is approximately 30 degrees.

In accordance with one embodiment, the dimensions and angles disclosed above for an embodiment of the reel assembly are used with a chain having links of 5.0 diameter, internal width W2 of 7.15× internal length L2 of 20.70. However, it should be understood that a chain with different dimensions may also be used. Additionally, the dimensions and angles of the reel assembly may be adjusted based on the type, size, and dimensions of the chain links. Accordingly, the dimensions and angles mentioned herein are not meant to be limiting.

Figure 7:
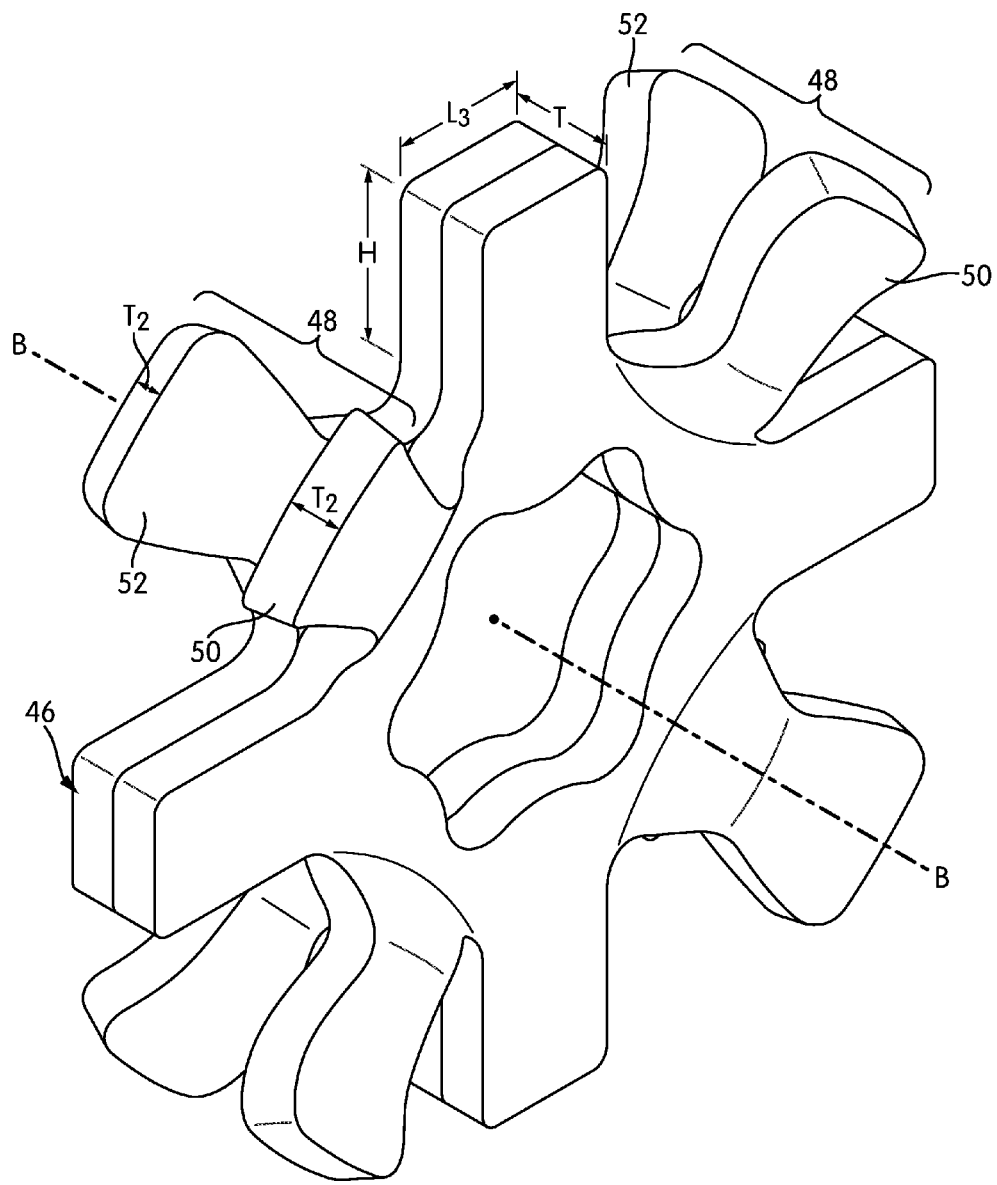
FIG. 7 shows a perspective view of the sprocket of the chain reel assembly.

Sprocket 40 is manufactured and formed from a first axial half 42 and a second axial half 44 that are fixedly secured together and substantially similar in design. FIGS. 7, 8, and 9 better illustrate details first and second axial halves 42 and 44 and their features before assembly into sprocket 40. As shown, each protrusion 46 is formed from a first portion 58 and a second portion 60 that are configured to be aligned and secured together to form its body. Each protrusion 46 has a length L3 and a thickness T that are determined such that they can fit through an opening of each alternate or horizontal link 24 of drive chain 16. For example, thickness T of protrusion 46 should be less than an internal width W2 (see FIG. 3) of each horizontal link 24, and length L3 of protrusion 46 should be less than an internal length L2 of horizontal link 24. Furthermore, each protrusion 46 comprises a height H that is configured to extend substantially if not entirely through the opening of each horizontal link 24 to hold the link. Height H of protrusion 46 can be greater than chain diameter D. (Height, thickness, and length also refer to the radial, axial, and circumferential directions. Likewise, if the chain is not formed of round links, the diameter would be the thickness of whatever material stock is used in the relevant directions.) Similarly, the distance circumferentially between adjacent protrusions 46 should be greater than the length L of each link so the vertical links can be received by the pairs of fingers 48 therebetween.

Also shown (e.g., see FIG. 8) are first fingers 50 for each pair 48 that are associated with first axial half 42, and second fingers 52 for each pair 48 are associated with second axial half 44. Each finger 50 and 52 has a thickness T2 that extends substantially an entire length between proximal portion 54 and distal end portion 56. Similarly, the distance axially between the fingers 50, 52 should be greater than the chain diameter D to receive its links vertically, and the distance circumferentially between adjacent pairs should be greater than the length L of each link so the horizontal links can be received on the protrusions 46 therebetween.

Each of first axial half 42 and second axial half 44 are substantially similar in that they comprise similarly shaped, and preferably identical, portions that are aligned and fixedly secured together. For example, parts of the protrusions 46 and pairs 48 of fingers are formed along a circumference of each base 36. Back sides of each first axial half 42 and second axial half 44 are secured together to form sprocket 40. Accordingly, it should be understood that the above described features of sprocket 40 are formed when first and second axial halves 42 and 44 are secured together. For example, with regards to forming central mounting portion 38, first axial half 42 and second axial half 44 each have their own central opening 38A and 38B (see FIG. 8) so that when first axial half 42 and second axial half 44 are aligned and fixedly secured together, central mounting portion 38 is formed. Similarly, each pair 48 of fingers is formed upon assembly.

To manufacture first and second axial halves 42 and 44 of sprocket 40 as disclosed herein, a stamping process is implemented. That is, in an embodiment, the first axial half 42 and second axial half 44 of sprocket 40 are stamped from sheet metal, and those are aligned and fixedly secured together at their back (i.e., internal) sides. In accordance with one embodiment, the halves 42 and 44 are secured together by welding. However, this is not limiting; other attachment options may also be used. Stamping involves impacting the sheet metal with a stamping die to cut the shape from the sheet metal and bend it into the final shape. This may be done by single stroke stamping (where the entire piece is cut and defined by a single die in one strike), or progressive stamping (where multiple strikes from different dies are used), each progressively stamping the shape towards its final shape.

Accordingly, it is in accordance with an embodiment of this disclosure to provide a method for forming chain reel assembly 30 for a chain hoist. The method includes, for example: stamping from sheet metal a first axial half 42 of sprocket 40; stamping from sheet metal a second axial half 42 of sprocket 40; and securing first axial half 42 and second axial half 42 together with the protrusion halves and the fingers of each pair axially aligned to form sprocket 40. The first axial half has first protrusion portions and first fingers extending from a perimeter thereof in an alternating configuration in a circumferential direction, and the second axial half has second protrusion portions and second fingers extending from a perimeter thereof in an alternating configuration in a circumferential direction. After the securing, the sprocket 40 comprises central mounting portion 38 for mounting with drive portion 34 of a reel 32, as well as the above described protrusions 40 and pairs 48 of fingers arranged around and extending in a radial direction from a perimeter thereof in an alternating configuration in a circumferential direction of the sprocket 40. That is, each protrusion 46 of the assembled or secured sprocket 40 has first protrusion portions of the first axial half and second protrusion portions of the second axial half that are circumferentially aligned to define the protrusion, and each pair 48 of fingers has first fingers (from the first axial half) and second fingers (from the second axial half) spaced apart from one another in an axial direction and each extend in the radial direction and circumferentially aligned with one another. Each protrusion 46 extends in the radial direction relative to the axis of the sprocket 40 and is constructed and arranged to at least partially extend through and engage at least insides of alternate circumferentially oriented links of a drive chain of the reel, and the pairs are configured to receive alternate radially oriented links therebetween and contact outsides thereof. As previously noted, in an embodiment, the central mounting portion 38 can be formed by stamping a central opening in first axial half 42, stamping a central opening in second axial half 44, and then aligning the central openings of the first and second axial halves 42 and 44 to form the central mounting portion.

Each of the halves is designed to be free of burrs and sharp edges so that they can be assembled satisfactorily and allow for safe handling, satisfactory appearance and/or function. One of skill in the art would understand that in accordance with an embodiment, further machining may be performed to provide smooth edges.

This stamped reel design can be manufactured at almost any location with stamping capabilities or that makes stamped parts, and is not restricted to facilities with casting experience or equipment. Also, stamping may be done as a cold forming process, thus eliminating the energy used to heat the casting furnace.

In an embodiment, the stamped reel is formed from High Strength Low Alloy (HSLA) steel. However, other materials may also be used for stamping the reel parts. Accordingly, sprocket 40 is less costly than traditional cast reels with regards to at least the materials needed (e.g., ductile cast iron material) and used to manufacture its parts.

Moreover, by forming such parts using a stamping method as disclosed above, the overall mass of the entire reel assembly is reduced (e.g., approximately 467 g for a cast iron reel (without a chain) to 297 g for a stamped reel assembly as disclosed herein (without a chain)).

Accordingly, the parts can be assembled as part of chain reel assembly 30 that may be used in a chain hoist 10 for a spare tire carrier (winch assembly) that uses a chain to support the tire, e.g., instead of a cable or wire rope. For example, as described above with reference to FIGS. 1 and 2, the sprocket 40 can be mounted to drive portion 34 of reel 32 and aligned with drive chain 16. The reel 32 can be contained in a housing that is mounted to a vehicle. Thus, the stamped reel assembly can be used to pull drive chain 16 through the hoist mechanism 10 when stowing the spare tire. Tire load and storage forces are transferred from the drive chain 16 to the chain reel assembly 30.

There are many methods of joining herein disclosed reel assembly to driving gears of the vehicle, which are not meant to be limited (e.g., welding, nut and bolt, rivet, etc.). Moreover, the shapes of such gears need not be limited (e.g., hex shape, square shape, etc.). Also, the reel assembly can be configured for connection to any size gear or gear assembly (e.g., for different gear ratios). This allows for less costly changes for alternative designs of chain hoists.

Modifications for other settings can include increasing or decreasing material thickness to accommodate different chain sizes and load requirements. In one embodiment, each side 42 and 44 of the sprocket can be made with a single thick plate (per side, such as shown in FIG. 8). In accordance with another embodiment, each side 42 and 44 can be made with two or more thinner plates (per side) that are laminated together. The overall size (e.g., diameter) of the stamped reel assembly can also be scaled for different sizes of chain links. The type of chain material and chain strength can also be varied. It should be understood that the length and width of the links in the chain 16 may affect the overall packaging size of the reel 30 and/or assembly 10. For example, a smaller link chain allows for a more compact design, which in turn adjusts the dimensions of the fingers and protrusions of the stamped reel assembly 30. That is, smaller links require a smaller cross section in the fingers and protrusions, thus reducing the load carrying capacity.

In accordance with an embodiment, the chain size used on the reel and with the reel assembly is ø5.0 mm with an inside chain width W2 of 7.15× inside length L2 of 20.70.

Accordingly, as described throughout, the herein disclosed reel assembly provides several improvements over the prior art. The forces are also distributed over more contact points than traditional (cast) reels. For example, in some traditional reels, only every other chain link makes contact with a part of the reel (e.g., in pockets). However, with the disclosed assembly, each chain link of the chain makes contact with an extended support portion (e.g., protrusion or finger) of sprocket 40 as it goes around during its rotation with reel 32. In particular, each link of the chain is engaged by a protrusion either on an inside of the link or guided on the outsides by a pair of fingers or flanges. Thus, the stamped reel assembly contacts both inside and outside surfaces of the chain link (e.g., rather than only outside surfaces as in prior art reels) as it is held thereon and guided rotationally. This provides, among other things, better force distribution across the chain links. Moreover, the reel assembly disclosed herein is formed from multiple parts that are assembled together. This reduces the overall mass and weight of the reel assembly, as compared to prior designs that are cast or molded.

Not all of the features described herein are mean to be limiting. Moreover, one of ordinary skill in the art would understand that in another embodiment, not all features must be formed on each of first axial half 42 and second axial half 44. For example, although in the illustrated exemplary embodiments the assembly of first and second axial halves 42 and 44 includes aligning central openings 38A and 38B to form central mounting portion 38 for mounting with drive portion 34 of reel 32, it should be understood that alternative designs may be used to form central mounting portion. For example, a central opening may be formed on one or the other of first axial half 42 or second axial half 44. That is, first axial half 42 may be formed with a central mounting portion configured for alignment and mounting on the drive portion 34, while second axial half 42 may be configured for attachment to the first axial half.

Additionally, it should be understood that there are many methods of joining the stamped sprocket assembly to driving portions or gears as well as alternate shapes for drive portions and/or central mounting portions and/or openings that may be used, e.g., hex shape, square shape, welded, nut and bolt, rivet, etc.

In accordance with another embodiment, the central mounting portion 38 of sprocket 40 may comprise a protrusion or enclosure configured to mount on or around drive portion 34 (rather than receive a drive portion, such as through its shaped opening).

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that several of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A reel assembly for a chain hoist comprising:
a drive portion configured for rotation about an axis;
a sprocket mounted to the drive portion and configured to be driven rotationally about the axis by the drive portion to drive a drive chain;
the sprocket comprising a first axial half and a second axial half fixedly secured and a central mounting portion for mounting with the drive portion;
the sprocket further comprising protrusions and pairs of fingers arranged around and extending in a radial direction from a perimeter thereof, the protrusions and the pairs of fingers being in an alternating configuration in a circumferential direction of the sprocket;
each protrusion extending in the radial direction relative to the axis of the sprocket and constructed and arranged to at least partially extend through and engage at least insides of alternate circumferentially oriented links of the drive chain, each protrusion comprising a first protrusion portion integrally formed as one-piece with the first axial half and a second protrusion portion integrally formed as one-piece with the second axial half with the first and second protrusion portions circumferentially aligned to define the protrusion; and
the pairs of fingers each comprising a first finger and a second finger spaced apart from one another in an axial direction and each extending in the radial direction, the first finger of each pair being integrally formed as one-piece with the first axial half of each pair and the second finger of each pair being integrally formed as one-piece with the second axial half, and the first finger and second finger of each pair being circumferentially aligned with one another,
wherein the pairs of fingers adjacent to each protrusion are each configured to receive alternate radially oriented links of the drive chain therebetween and contact outsides thereof.

2. The reel assembly according to claim 1, wherein each protrusion is further constructed and arranged to engage outside ends of the adjacent radially oriented links of the drive chain that are received between the adjacent pairs of fingers and connected to the alternate circumferentially oriented links that each protrusion extends at least partially through.

3. The reel assembly according to claim 1, wherein the first finger and the second finger of each of the pairs of fingers are configured to engage outside ends of the adjacent circumferentially oriented links of the drive chain that are on the adjacent protrusions and connected to the alternate radially oriented links received therebetween.

4. The reel assembly according to claim 3, wherein the first finger and the second finger of each of the pairs of fingers extend at an acute angle relative to a plane that is perpendicular to the axis for rotation.

5. The reel assembly according to claim 1, wherein each protrusion and each pair of fingers is spaced substantially equidistant from each other in the circumferential direction.

6. The reel assembly according to claim 1, wherein the central mounting portion of the sprocket is an opening.

7. The reel assembly according to claim 6, wherein the first axial half and the second axial half of the sprocket each comprise a central opening, and wherein the central openings of each of the first axial half and the second axial half are aligned when fixedly secured together to form the central mounting portion.

8. The reel assembly according to claim 1, wherein the first axial half and the second axial half of the sprocket are stamped sheet metal.

9. A chain hoist system for a spare tire carrier in a vehicle comprising:
an attachment device for holding a spare tire;
an elastic member adjacent to the attachment device and configured for movement between a storage position and an extended position, and
a housing containing a reel assembly for a chain hoist configured to move the elastic member between its storage position and extended position, the reel assembly comprising:
a drive portion configured for rotation about an axis;
a sprocket mounted to the drive portion and configured to be driven rotationally about the axis by the drive portion to drive a drive chain;
the sprocket comprising a first axial half and a second axial half fixedly secured together and a central mounting portion for mounting with the drive portion;
the sprocket further comprising protrusions and pairs of fingers arranged around and extending in a radial direction from a perimeter thereof, the protrusions and the pairs of fingers being in an alternating configuration in a circumferential direction of the sprocket;
each protrusion extending in the radial direction relative to the axis of the sprocket and constructed and arranged to at least partially extend through and engage at least insides of alternate circumferentially oriented links of the drive chain, each protrusion comprising a first protrusion portion integrally formed as one-piece with the first axial half and a second protrusion portion integrally formed as one-piece with the second axial half with the first and second protrusion portions circumferentially aligned to define the protrusion; and
the pairs of fingers each comprising a first finger and a second finger spaced apart from one another in an axial direction and each extending in the radial direction, the first finger of each pair being integrally formed as one-piece with the first axial half of each pair and the second finger being integrally formed as one-piece with the second axial half, and the first finger and second finger of each pair being circumferentially aligned with one another, wherein the pairs of fingers adjacent to each protrusion are each configured to receive alternate radially oriented links of the drive chain therebetween and contact the outsides thereof.

10. The chain hoist system according to claim 9, wherein each protrusion is further constructed and arranged to engage outside ends of the adjacent radially oriented links of the drive chain that are received between the adjacent pairs of fingers and connected to the alternate circumferentially oriented links that each protrusion extends at least partially through.

11. The chain hoist system according to claim 9, wherein the first finger and the second finger of each of the pairs of fingers are configured to engage outside ends of the adjacent circumferentially oriented links of the drive chain that are on the adjacent protrusions and connected to the alternate radially oriented links received therebetween.

12. The chain hoist system according to claim 11, wherein the first finger and the second finger of each of the pairs of fingers extend at an acute angle relative to a plane that is perpendicular to the axis for rotation.

13. The chain hoist system according to claim 9, wherein each protrusion and each pair of fingers is spaced substantially equidistant from each other in the circumferential direction.

14. The chain hoist system according to claim 9, wherein the central mounting portion of the sprocket is an opening.

15. The chain hoist system according to claim 14, wherein the first axial half and the second axial half of the sprocket each comprise a central opening, and wherein the central openings of each of the first axial half and the second axial half are aligned when fixedly secured together to form the central mounting portion.

16. The chain hoist system according to claim 15, wherein the first axial half and the second axial half of the sprocket are stamped sheet metal.

17. A method for forming a reel assembly for a chain hoist, the method comprising:
  stamping from sheet metal a first axial half of a sprocket, the first axial half comprising first protrusion portions and first fingers extending from a perimeter thereof in an alternating configuration in a circumferential direction;
  stamping from sheet metal a second axial half of the sprocket, the second axial half comprising second protrusion portions and second fingers extending from a perimeter thereof in an alternating configuration in a circumferential direction; and
  fixedly securing the first axial half and the second axial half together to form the sprocket,
  wherein after the securing, the sprocket comprises a central mounting portion for mounting with a drive portion of a reel and further comprises protrusions and pairs of fingers arranged around and extending in a radial direction from a perimeter thereof, the protrusions and the pairs of fingers being in an alternating configuration in a circumferential direction of the sprocket; each protrusion extending in the radial direction relative to the axis of the sprocket and constructed and arranged to at least partially extend through and engage at least insides of alternate circumferentially oriented links of a drive chain of the reel, each protrusion of the sprocket comprising first protrusion portions of the first axial half and second protrusion portions of the second axial half that are circumferentially aligned to define the protrusion; and the pairs of fingers each comprising first fingers and second fingers spaced apart from one another in an axial direction and each extending in the radial direction, the first fingers of each pair from the first axial half and the second fingers of each pair from the second axial half, and the first finger and second finger of each pair being circumferentially aligned with one another, and wherein the pairs of fingers of the sprocket adjacent to each protrusion are each configured to receive alternate radially oriented links of the drive chain therebetween and contact outsides thereof.

18. The method according to claim 17, wherein the first axial half and the second axial half of the sprocket each comprise a central opening, and wherein the method further comprises:
  stamping a central opening in the first axial half;
  stamping a central opening in the second axial half; and
  aligning the central openings of the first and second axial halves to form the central mounting portion.

* * * * *